3,130,100
METHOD AND APPARATUS FOR BUTT
SPLICING SHEET MATERIAL
Victor H. Hasselquist, Akron, Ohio, assignor to The B. F.
Goodrich Company, New York, N.Y., a corporation of
New York
Filed July 17, 1956, Ser. No. 598,313
27 Claims. (Cl. 156—157)

This invention relates to the preparation of butt spliced adhesive sheet material such as unvulcanized rubber-treated fabrics, and is especially useful in the preparation of bias-cut unvulcanized rubber-covered cord fabric used as ply stock in the manufacture of pneumatic tires. The term "butt splicing" in this specification means adhering an edge of one fabric piece to an edge of an adjoining fabric piece without overlapping the margins of said edges.

The present invention advantageously supersedes the traditional lap-splicing techniques which have been used in the rubber industry in preparing ply-stock for the manufacture of pneumatic tires. It has been widely recognized that lap-spliced plies may cause objectionable structural defects such as undesirable "heavy" spots, displaced cords and the like in a tire casing. Lap splicing has nevertheless survived, however, because prior to this invention no satisfactory mode of mechanically butt splicing ply stock has been developed.

In addition to the possible objectionable structural characteristics of tires made with lap spliced plies, the existing techniques for lap splicing are grossly inefficient from a manufacturing standpoint. In general, the operations for making lap-splices have been performed manually and have required a measure of skill and judgment on the part of the workmen engaged in this activity. Lap splicing has not been conveniently adaptable to fully automatic equipment, chiefly because of the necessity for aligning margins of the stock pieces with precision, and because of the difficulty of handling the fabric pieces which may have a thickness in the order of about .030 in. but which may be as much as 5 ft. or more in width along the overlapping margins. Furthermore, freshly calendered bias cut rubber-covered fabric normally tends to adhere readily to itself by merely touching two surfaces of it together, whereas similar fabric which is somewhat aged when it is bias cut may be very diffiicult to adhere. Thus in lap-splicing, it has been necessary for the workmen to appraise the condition and age of the fabric pieces and have sufficient experience in this work to adjust the splicing procedures accordingly. Also, because of the comparative slowness of lap splicing techniques, it has been necessary to prepare ply stock well in advance of actual tire building, necessitating considerable handling and storage space for ply stock in process, and delay in tire production until an adequate backlog of spliced ply stock is available.

According to the present invention, opposing edges of successive pieces of rubber-treated fabric such as bias-cut tire cord fabric, regardless of their comparative freshness, may be automatically butt spliced so that the resulting adhering edges are scarcely discernible and are of substantially the same strength as the fabric portions intermediate the splices. Moreover, butt splicing for tire cord fabric may be accomplished at a speed which permits spliced stock to be fed directly to a tire building machine.

Butt splices are made, according to this invention, by confining substantially the entire area of the margins along each of the opposing edges of two fabric pieces in a common plane, and while the margins are thus subjected to confining pressure, their opposing edges are butted forcibly together into mutual adhering relation. In a preferred embodiment of the invention hereinafter described, splicing mechanism is provided which includes a plurality of sets of opposed splicing shoes. The several sets of splicing shoes are operable in cooperation with means on which the margins are supported with their respective edges opposed for splicing to exert such confining pressure on these margins, and for displacing the margins coplanarly, if necessary, to butt the opposing edges forcibly together into mutual adherence. Inasmuch as a substantial area of the margins adjacent the adhered edges are confined by the shoes as the edges are urged together, the edges are prevented from curling away from each other and having their respective cords displaced or distorted while the splice is made.

To augment the adhesion between the abutting edges of such fabric pieces, the invention provides for further amalgamating the fabric pieces by transposing portions of the rubber covering of the pieces from one margin to the other while the edges are forcibly butted together. In the illustrated embodiment, this is accomplished by shifting the splicing shoes coplanarly relative to the margins after their opposing edges have been butted together to scrape or skin a portion of the rubber covering from at least one of the margins and deposit it adheringly on the other margin. In transposing this small amount of the rubber covering across the abutting edges, some of the displaced rubber is packed by the shoes into such interstices as may exist between the abutting edges, making the resulting splice substantially as strong as the remaining portions of the fabric. This amalgamating action has the particular advantage that an effective butt splice may be formed between opposed edges of two bias-cut pieces of cord fabric even though one or both of the pieces terminates in a so-called "bare" cord at the spliced edges. A bare cord, as its name implies, is a cord along one of the edges to be spliced which is not totally covered with rubber, and this condition sometimes results in the original calendering or other stock processing operations prior to bias cutting. Heretofore, the problem of forming a satisfactory butt splice between pieces having bare edge-cords has been a major obstacle to the success of butt splicing tire cord fabric, and the inability to form a splice under these conditions has been one of the principal limitations of butt-splicing apparatus which has been previously proposed.

In accordance with the principles of this invention, an effective splice may be made between two fabric pieces even though the opposed edges of the pieces are not parallel, either because of the way in which pieces are initially positioned for splicing, or because of irregularities in the shape of the edges. It is frequently observed that the opposed edge of bias cut fabric pieces are slightly curved concavely away from each other intermediate the cut edges of the pieces, a condition apparently resulting from the manner in which the pieces are cut on a bias cutter. While the invention includes mechanism for precisely positioning the opposing edges within certain limits, the splicing mechanism hereinafter described automatically compensates for lack of uniformity in the initial spacing between the opposed edges.

In the initial phase of a splicing operation, the margins of the opposed edges of the sheets are normally shifted toward each other relative to the support means against which the margins are confined. To decrease the resistance of the margins to such movement, the margin-supporting means opposite the shoes are preferably provided with means which cooperate with the splicing shoes to allow the margins to be shifted easily. Upon completion of a splice, the latter means also operates to strip the margins from the underlying surface, thereby preventing the margins from adhering to the supporting surface. The invention further includes mechanism operable sequentially with the movements of the splicing heads to regulate the delivery of stock to the splicing heads and to position the opposed edges relative to the splicing shoes for each splice.

The invention will be further described with reference to the accompanying drawings which, by way of example, illustrate a preferred apparatus especially suitable for butt splicing bias cut pieces of unvulcanized rubber-calendered cord fabric for tire ply stock. It will be understood that while the illustrated apparatus and the inventive principles it embodies have arisen primarily from the problems characteristic of butt splicing such pieces of tire cord fabric, the invention may be advantageously employed for butt splicing sheets of other rubber fabrics and similar adhesive sheet materials.

How a Splice Is Made

Figure 1:
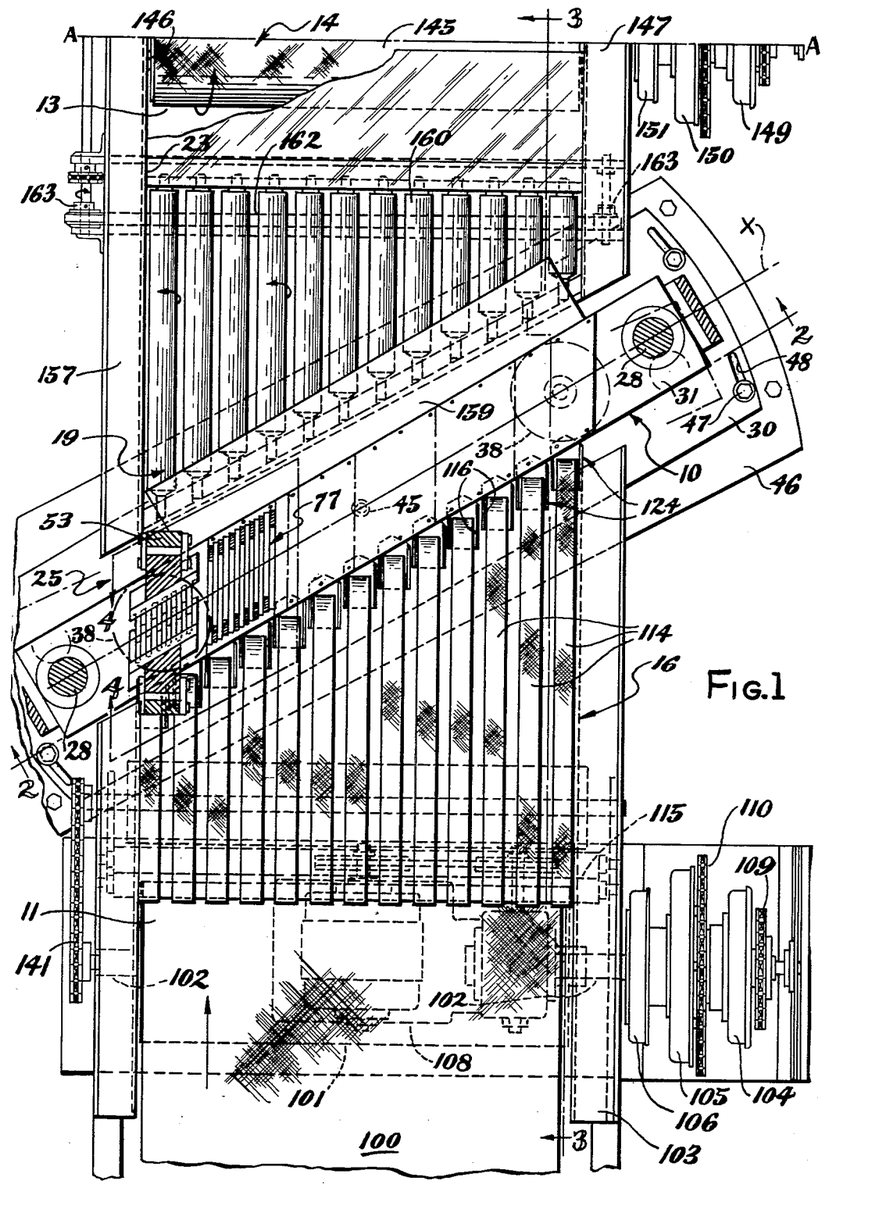
FIG. 1 is a plan view of a splicing apparatus with the splicing heads omitted (see line 1—1 of FIG. 2)

Referring to FIG. 1, a butt splicing mechanism 10 (hereinafter called the "splicer") is positioned between the delivery end 11 of a stock feed conveyor 12 and the receiving end 13 of a stock take-off conveyor 14. A piece of bias-cut weftless cord fabric 15 (see FIG. 6a) is advanced by the feed conveyor 12 to a receiving apron 16 ahead of the splicer (the left in FIG. 1) and is positioned by this apron so that the leading edge 17 (FIG. 6b) of the fabric piece is within the splicer close to the trailing edge 18 of the preceding piece 15s. Then, as hereinafter explained, the splicer 10 operates automatically to butt splice edge 17 to edge 18. As soon as the splice is completed, take off conveyor 14 advances the resulting spliced strip of fabric 15s (FIG. 6c) forwardly through the splicer 10 over a take-off apron 19 immediately behind the splice 10 to reposition the strip 15s so that another fabric piece 15 may be spliced to the end of this strip. The continuous spliced strip 15s may be fed as it is spliced directly to a tire-building machine (not shown) or to equipment for rolling the strip for storage (not shown).

Each piece of bias cut fabric 15 is delivered to apron 16 with its cut edges 22 (the edges at which the cord ends are exposed, see FIG. 6) parallel to the travel direction of the feed conveyor 12, and with its cords parallel to its leading edge 17 and trailing edge 18. The edges 17 and 18 are, in turn, parallel to the oblique splicing axis "X" in FIG. 1 along which the splicer 10 is oriented relative to the longitudinal axis of the conveyors 12 and 14. The conveyors 12 and 14, and the aprons 16 and 19 each include a longitudinal guide rail 23 at one side against which one of the bias-cut edges 22 of the fabric is positioned as it is moved toward and away from the splicer 10.

The splicer 10 includes a series of individual splicing heads 25 (see FIG. 2; all but one is broken away) which are collectively supported by a frame 27 vertically slidable on a pair of stationary vertical columns 28. The upper end of the columns 28 are interconnected by a tie plate 29 and the lower ends of these columns are securely seated in a base plate 30. Intermediate the base plate 30 and the tie plate 29 the columns support the opposite ends of a rigid table 31, which is fastened securely to the columns and upon which the margins of the fabric pieces are positioned when a splice is made.

Figure 2:
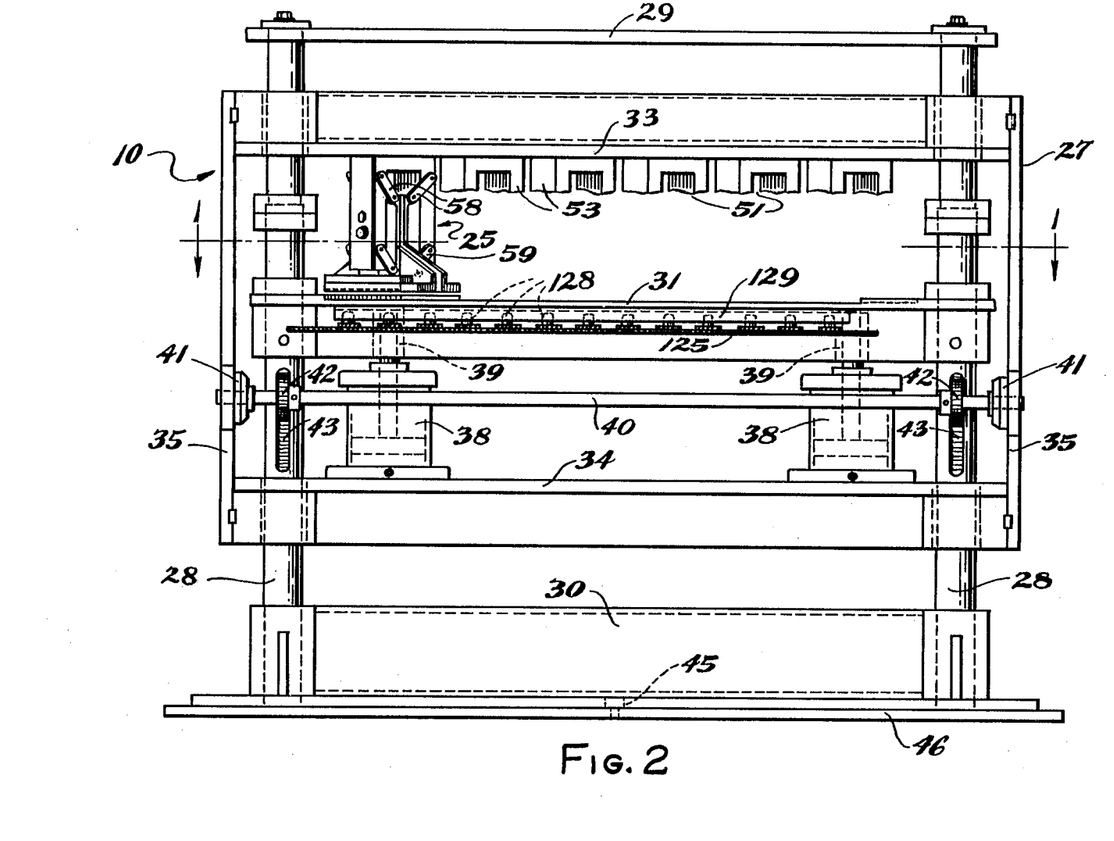
FIG. 2 is an elevational view taken approximately along the line 2—2 of FIG. 1, showing one splicing head in full and additional splicing heads broken away.

The movable frame 27 is of generally rectangular shape as shown in FIG. 2 and includes an upper rail 33 above the table 31 from which the several splicing heads 25 are suspended, and a lower rail 34 below the table 31, which is interconnected with the upper rail 33 by vertical bars 35 at the ends of these rails. The end portions of upper and lower rails 33 and 34 are also slidably engaged with the columns 28 and the vertical position of the frame 27 relative to the table 31 is regulated by a pair of pneumatic pressure cylinders 38. The cylinders 38 are mounted on the lower rail 34 and include projecting piston rods 39 which are in threaded engagement of the lower side of the table 31. By energizing cylinders 38 to extend or retract piston rods 39, the frame 27 may be reciprocated vertically along the columns relative to the stationary table 31 to move all the splicing heads 25 simultaneously toward and away from the table.

To maintain the frame 27 in alignment with the columns 28 so that it may be slid freely along the columns, the frame 27 is further provided with a horizontal shaft 40 journaled at its ends in the vertical end bars 35 of the frame in appropriate bearings 41 and carrying pinions 42 engaged with vertical rack teeth 43 on the columns 28.

To adjust the splicer 10 so that it may accommodate fabric pieces bias-cut at different bias angles, the base plate 30 to which the columns 28 are secured is pivotally mounted at its geometrical center intermediate the columns 28 on a central pivot 45 on a stationary bed plate 46. The splicer 10 may therefore be swiveled about the pivot 45 relative to the bed plate 46 to vary the orientation of its axis "X" in FIG 1, and the splicer 10 may be secured at any particular angle desired for axis "X," within the designed limits, by bolts 47 (see FIG. 1) extending through arcuately slotted openings 48 at the opposite ends of the base plate and threaded into the bed plate 46. Tire cord stock is normally bias-cut at an angle of about 61° to the longitudinal center-line of the calendered strip, and accordingly the splicer 10 is usually oriented with its axis "X" at 61° to the direction of travel of the conveyors 12 and 14. The bias angle may vary plus or minus several degrees from 61° and thus the total range of adjustment usually need not exceed about six degrees for handling tire cord stock.

*Details and Operation of the Splicing Heads 25*

Details of the splicing heads 25 are best shown in FIGS. 4 and 7–11. Each includes an inverted U-shaped hanger 51 (see FIG. 7) having an upper leg 52 interconnecting a pair of downwardly directed parallel legs 53. Each leg 53 supports a vertical bar 55 by a set of upper links 58 and a set of lower links 59, the opposite ends of each set of links being pivotally connected to bar 55 and to its respective supporting leg 53. The upper sets of links 58 are of the same length and are parallel to their respective sets of lower links 59 so that these links together with their respective bars 55 and legs 53 form a parallelogram linkage. Thus each bar 55 is movable longitudinally relative to but also parallel to the legs 53. At the lower end of each bar 55 there is secured a transverse anchor bar 63 having an L-shaped cross-sectional shape and extending generally parallel to the splicing axis "X" (see FIG. 4) in spaced relation to its counterpart anchor bar 63 supported by the opposite bar 55. To the bottom of each anchor bar 63, there is fastened one of a pair of flat splicing shoes 65.

Figures 1A, 4, 5, 6A, 6B, 6C:
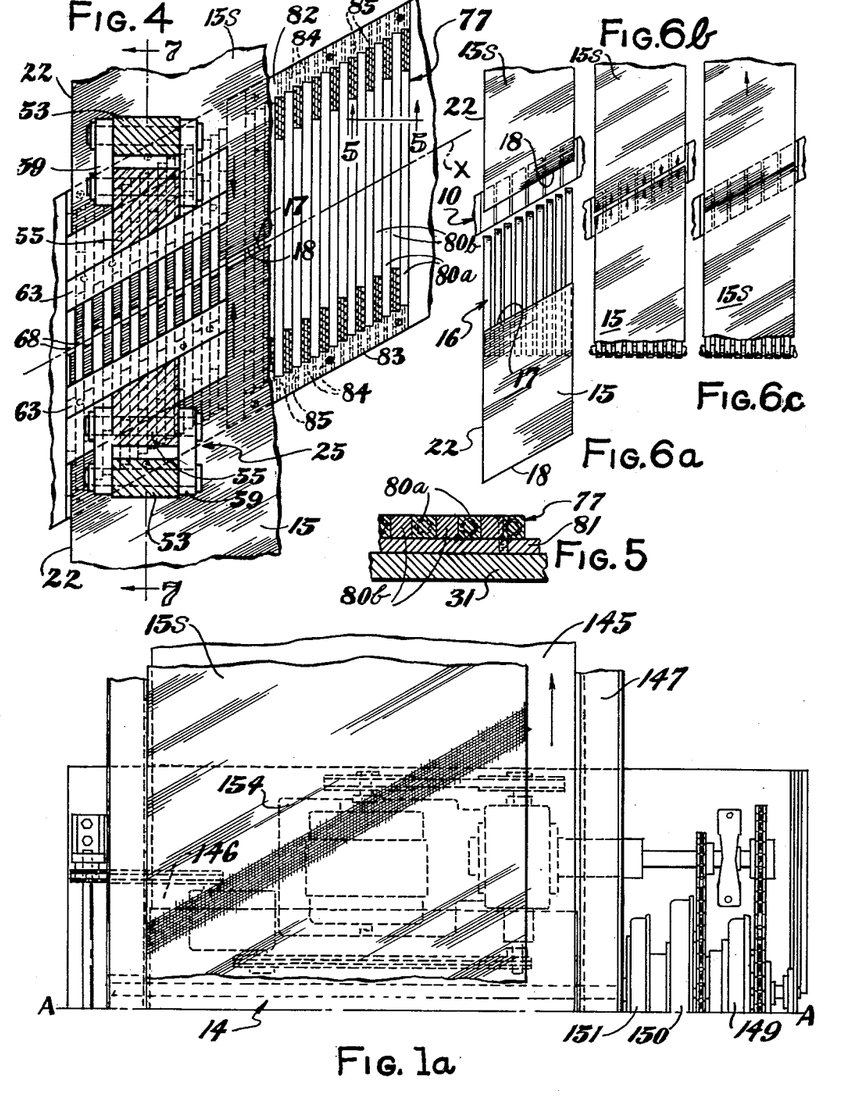
FIG. 1A is a continuation of FIG. 1 in the region beyond the line A—A of FIG. 1.
FIG. 4 is a plan view of the region of FIG. 1 enclosed by the line 4—4 but drawn on an enlarged scale; the view also shows a section taken along the line 4—4 of FIG. 7.
FIG. 5 is a detailed sectional view taken on the line 5—5 of FIG. 4.
FIGS. 6a, 6b and 6c are schematic plan views illustrating successive stages in splicing stock.

Referring to FIG. 4 (see also FIG. 10), each shoe 65 is shaped in its plan aspect like a parallelogram and includes a heel portion 66 having a series of flat teeth 68 which project transversely to the opposing edges of the fabric and which are intermeshed along the splicing axis "X" with corresponding teeth 68 on the opposite shoe. When the heads 25 are retracted, preferably the teeth of each set of shoes 65 are intermeshed sufficiently so that the tip of each tooth 68 extends across the gap between the opposing edges 17 and 18 of fabric pieces 15 positioned under the shoes 65. Further, the teeth 68 are parallel to the side or cut edges 22 of the fabric sheets. The "soles" or bottom fabric engaging surfaces 69 of the opposing shoes 65 are coplanar and are adapted to engage and confine substantially the entire area of the margins of the opposing edges 17 and 18 of fabric pieces 15 against the underlying surface of table 31 when the heads are lowered by the frame 27.

Although only one splicing head 25 is shown in FIG. 2, it will be understood that the upper rail 33 carries a group of splicing heads 25 identical to the single head illustrated as indicated by the fragments of their supporting brackets 51 in this figure. The several heads 25 are arranged with their splicing shoes closely adjacent each other in an echelon along the splicing axis "X" so that the sets of shoes 65 engage substantially the total marginal area of each edge 17 and 18 of the fabric pieces when the frame 27 is appropriately lowered by the cylinders 38.

Figures 7, 8, 9, 10, 11:
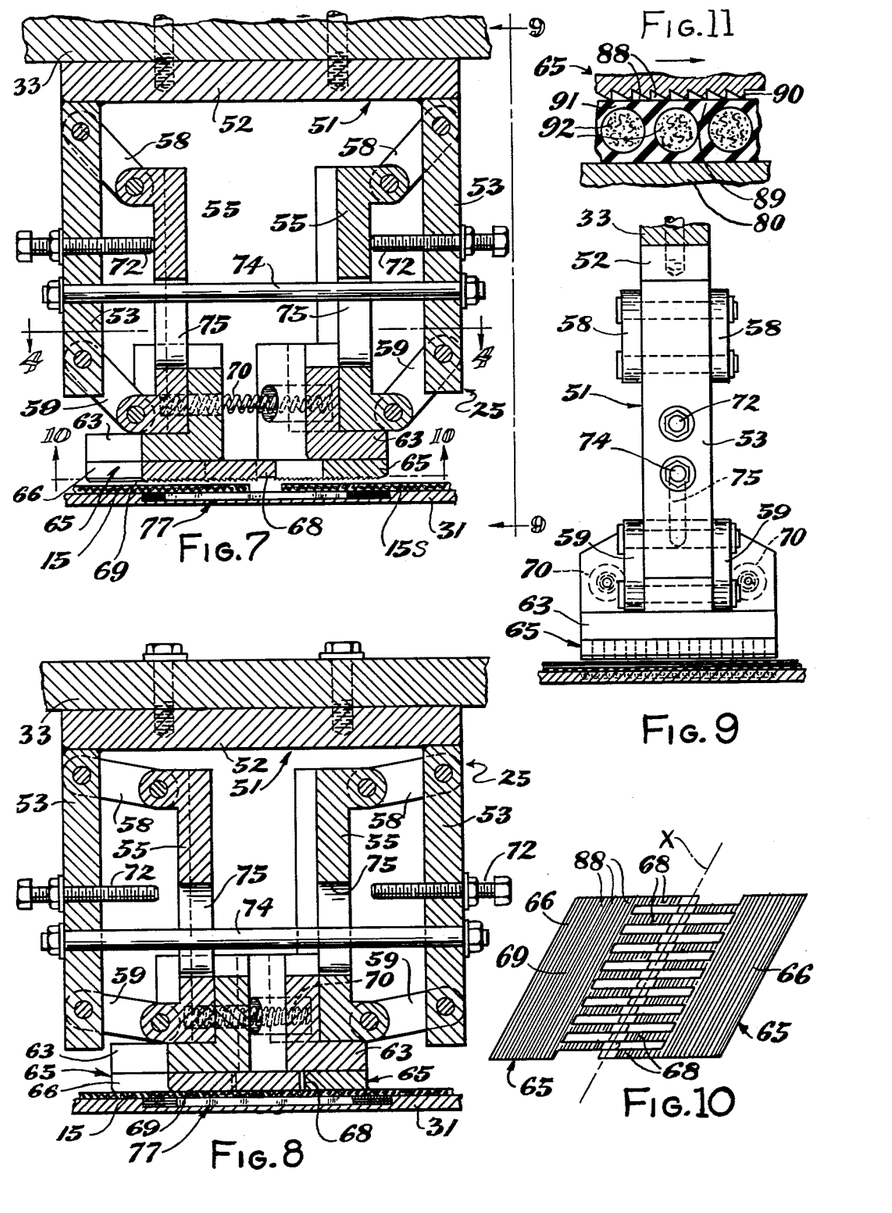
FIG. 7 is a cross-sectional view taken on the line 7—7 of FIG. 4 but showing one complete splicing head in its position when the splicing mechanism is in retracted condition.
FIG. 8 is a view similar to FIG. 7 but showing the position of a splicing head at the conclusion of a splicing operation.
FIG. 9 is a side view of a splicing head taken along the line 9—9 of FIG. 7.
FIG. 10 is a view of the "sole" or margin-engaging surface of the splicing shoes, taken along the line 10—10 of FIG. 7.
FIG. 11 is a fragmentary detail view showing the preferred profile of the lower surface of the splicing shoes and a cross section through a piece of cord fabric, drawn to an enlarged scale.

While the heads 25 are retracted from the table 31 in the position shown in FIG. 7, the opposing shoes 65 of each head are biased apart by a pair of springs 70 (see also FIG. 9) interposed between the vertical portions of the anchor bars 63 above the shoes 65 in sockets 71 near the ends of these bars. (Springs 70 have been omitted from FIG. 4.) The springs 70 are under high compression and the outward forces exerted by these springs against anchor bars 63 are resisted by stop screws 72 threaded through the legs 53 to engage the vertical shoe-supporting bars 55. The screws 72 may be adjusted to regulate the clearance between the shoes 65 and the table, and thereby regulate the extent of meshing engagement of the teeth 68 of each set of shoes and the corresponding coplanar relative movement of the shoes 65 of each head during a splicing operation. Also, the screws 72 may be adjusted against the bars 55 to raise the shoes 65 of one or more heads an appreciable distance above the table and thereby render these particular heads inactive during the splicing movement of the frame 27. This is advantageous for splicing fabrics appreciably narrower than the width of apron 16.

When the movable frame 27 is lowered by energizing the cylinders 38, to extend their respective pistons 39, the splicing heads 25 are moved downward bringing the soles 69 of the splicing shoes 65 into engagement with the opposing margins of the fabric pieces 15 and 15s supported on table 31. Further downward movement of the frame 27 presses the shoes firmly against the margins and urges the vertical legs 53 of each bracket 51 downward relative to their respective vertical shoe-supporting bars 55. The resulting pivotal movement of the ends of the links 58 and 59 thereby urges the opposing shoe-supporting bars 55 laterally toward each other while at the same time maintaining these bars parallel to each other. This movement of bars 55 in turn moves the opposing shoes 65 together in the plane of their respective teeth and relative to the table 31, the teeth 68 of the opposing shoes moving counter to each other until they are meshed to their maximum depth. Since the opposing margins are maintained under substantial vertical confining force by the shoes 65, the margins are displaced coplanarly toward each other with the movement of the splicing shoes because of the frictional engagement of the shoes with the margins until the opposing edges 17 and 18 are forcibly butted together.

A rigid tie rod 74 extends horizontally between the legs 53 through vertical slots 75 in the bars 55. The tie rod 74 restrains the vertical legs 53 from flaring outwardly from each other as a result of the horizontal outward forces acting on these legs from the toggle-like action of the leaks 58 and 59 when the shoes are being shifted into full meshing engagement.

When the shoes are fully meshed (FIG. 8) at the conclusion of a splicing operation, the springs 70 will be highly compressed. Accordingly, as soon as the frame 27 is thereafter elevated, the springs 70 expand to separate and reset the shoes 65 against the stop screws 72 (the position of FIG. 4) to await positioning of additional fabric margins below the splicing shoes.

To minimize resistance of the surface of table 31 to coplanar displacement of the margins by the shoes, the surface of the table 31 underlying the fabric margins along the splicing axis "X" is inlaid with a series of mechanisms 77 (see FIGS. 1 and 4) each of which is coextensive in area and cooperates with the particular set of splicing shoes 65 supported directly above it. Only one such mechanism 77 is shown in detail in FIG. 1 and FIG. 4 but it is to be understood that one is provided under each set of shoes 65 along the length of the table 31.

Referring to FIGS. 4 and 5, the mechanisms 77 each comprise a series of narrow bars 80a which are longitudinally and horizontally slidable in a direction counter to a series of similar narrow bars 80b disposed slidably and alternatively between bars 80a. The bars 80a and 80b are of equal length and are of rectangular cross-section and they are packed together side-to-side in a direction parallel to the intermeshed teeth 68 of the shoes so that they collectively support the fabric margins. The upper surface of each bar 80a is flush with its adjacent bars 80b and both series of bars are collectively supported for horizontal slidable movement on a flat plate 81 (see FIG. 5) which has a parallelogram shape similar to the shape of the sets of intermeshed shoes 65 and which is secured to the table top 31. Along opposite margins of plate 81 there are end bars 82 and 83 (FIG. 4) transverse to the ends of bars 80a and 80b to limit the slidable movements of the latter.

Each bar 80a and 80b has a short axial guide pin 84 (FIG. 4) projecting from one end, and a longer guide pin 85 projecting axially from its other end. The sliding bars 80a are arranged so that each has its short pin 84 extending slidably into end plate 83, whereas each sliding bar 80b has its short pin 84 projecting into end plate 82. Thus the long guide pins 85 of bars 80a extend slidably thru end bars 82, whereas the long guide pins 85 of bars 80b extend slidably thru end bars 83. Surrounding the long guide pin of each bar 80a and 80b is a compressed coil spring 86 which normally biases its respective sliding bar axially against the particular end plate 82 or 83 into which the short guide pin 84 of its respective sliding bar projects.

Each slidable bar 80a and 80b is accurately located in vertical mating alignment with a corresponding tooth 68 of its respective set of splicing shoes 65, and the width of the exposed upper surface of each slidable bar (on which the fabric margins are positioned) is exactly equal to the width of the surface of tooth 68 mating with the bar. Specifically, in FIG. 4 for example, the bars 80a mate with teeth 68 of a shoe 65 above the margins of edge 17; similarly bars 80b mate with the teeth 68 of a shoe above the margin of edge 18. When the shoes 65 are lowered against these margins, the margins are confined under substantial pressure between the teeth 68 of the shoes and the bars 80a and 80b.

As the opposing shoes 65 of each head are urged toward each other by the downward movement of frame 27, the teeth 68 displace their respective mating bar 80a or 80b (as the case may be) slidably forward with the shoes because of the frictional connection of the fabric between the tooth and the bar. Thus the teeth 68 and the mating bars transport the fabric margins toward each other while maintaining the margins closely confined until the edges 17 and 18 of these margins are butted directly against each other. The bars 80a and 80b are moved longitudinally in this manner in counter directions against the resistance of their respective springs 86, and the guide pins 84 and 85 of these bars are adapted to slide freely through the openings which receive them in the end bars 82 and 83 to permit such sliding movement. The lateral abutting sides of the bars 80a and 80b may be lubricated with graphite or the like to enable adjacent bars to move easily in counter directions.

Each bar 80a or 80b moves with its respective tooth 68 at least until the edges 17 and 18 of the fabric are butted together, so that the spring 86 of each bar is substantially compressed. After the splice is completely formed, and as soon as the vertical pressure of the shoes 65 against the margins is relieved (by elevating frame 27), these springs 86 expand to reseat the guide bars with their short guide pins extending fully into their respective transverse end bars. This reseating movement of the bars thereby tends to strip the fabric margins from the bars 80a and 80b if the margins happen to be tacky and tend to stick to any of these bars.

Prior to a splicing movement of the heads 25 described in the foregoing, the margins of the pieces are positioned below the splicing feet 65 with a gap between the opposed edges 17 and 18 which is substantially narrower than the total coplanar distance traversed by each splicing shoe 65 after these shoes engage the opposing margins. The splicing heads 25 are designed so that the edges 17 and 18 are butted together during the initial inward movements of the splicing shoes 65, and during the remaining stroke of the opposing shoes, the teeth 68 are moved relative to the margins across the butted junction of edges 17 and 18 from one margin to the other margin until the teeth are fully meshed with each other. During this latter movement, each tooth 68 preferably tends to scrape or skin a thin narrow strip of rubber from the rubber cushion above the cords on each margin and to smear this skinned portion of rubber forcibly across the butted junction of the edges to the opposite margin. Thus the rubber cushions of the opposed margins are amalgamated or "knitted" together across the junctions of the edges 17 and 18 by a series of narrow interlocking strips of rubber which have been smeared across the splice junction. Since the teeth 68 of the opposing shoes of each head are meshed in laterally abutting relation, and the splicing movement of the shoes is transverse to the cords of the fabric, at least some portion of the skin of rubber moved across the junction is packed between the end-most cords of each margin to provide a substantial rubber cushion between the end-most cords and thereby augment the adherence of edge 17 to the opposing edge 18. A very thin layer of rubber is scraped from each margin by the teeth 68, leaving an ample rubber covering above the cords at the splice.

To enable the shoes 65 to skin a thin layer of the rubber cushion from each margin, the sole or margin-engaging surface 69 of each shoe (including its teeth 68) is preferably striated with fine narrow parallel grooves 88 (see FIGS. 7, 10 and 11) defining sharp ridges 89 having vertical faces 90 directed toward the opposite shoe. The profile of such ridges 89 is greatly enlarged in FIG. 11 and in this figure it may be noted that the height of the ridges 89 is substantially less than the thickness of the rubber cushion 91 above the cords 92 so that the cords are not stripped bare. As shown in FIG. 10, the grooves 88 terminate at about the middle of each tooth 68, the surface near the tip of each tooth being smooth. This smooth surface portion of each tooth preferably overlaps and is engaged with the opposing margin when the shoes are initially brought into engagement with the opposing margins at the start of a splicing cycle, to minimize resistance to displacement of the margins to close the gap between their opposing edges.

In FIGS. 4 and 6b attention is directed to the fact that the teeth 68 and the direction in which they are moved to butt the fabric edges 17 and 18 together are parallel to the longitudinal or cut edges 22 of the fabric pieces. That is to say, the splicing forces exerted by the teeth 68 are applied at an angle to the spliced edges 17 and 18 which is equal to the bias angle at which the fabric pieces are cut. Thus when the splice is completed the longitudinal cut edges 22 of the two joined fabric pieces are accurately aligned with each other at the splice. The application of splicing force at some other angle (say perpendicularly to edges 17 and 18) results in a splice with the longitudinal edges 22 offset from each other at the splice and is unacceptable. Further, splicing force applied perpendicular to the edges 17 and 18 tends to disarrange the lay of the cords which, as previously noted, extend parallel to the edges 17 and 18.

Although only six splicing heads are indicated in FIG. 2, it will be understood that any number may be used, depending on the width of the fabric and the space available on frame 27. Best splicing results are obtained by using a great many, narrow splicing heads. That is to say, the available space on frame 27 should be occupied by as many individual splicing heads as may be physically placed above the fabric margins, in preference to fewer but wider splicing heads.

A particular advantage resulting from the use of a plurality of independent splicing heads, and the extended inward coplanar movement of their respective splicing shoes is that the opposing edges may be eventually butted together throughout the length of these edges, even though the initial gap between these edges varies in width from place to place along the edges. Thus at the portion of the margins where the gap is narrow, the edges will be butted together in the initial inward movements of the shoes engaged with this portion; whereas at another portion of the margins where the gap may be wider, the splicing shoes engaged with this latter portion can displace these latter portions of the margins a greater distance to abut these portions of the edges. As previously noted, the irregularity in the gap may be due to irregularities in the shape of the edges, or to a slight misalignment in positioning the margins for splicing.

*Feeding Fabric to and From the Splicer*

Figures 3, 12:
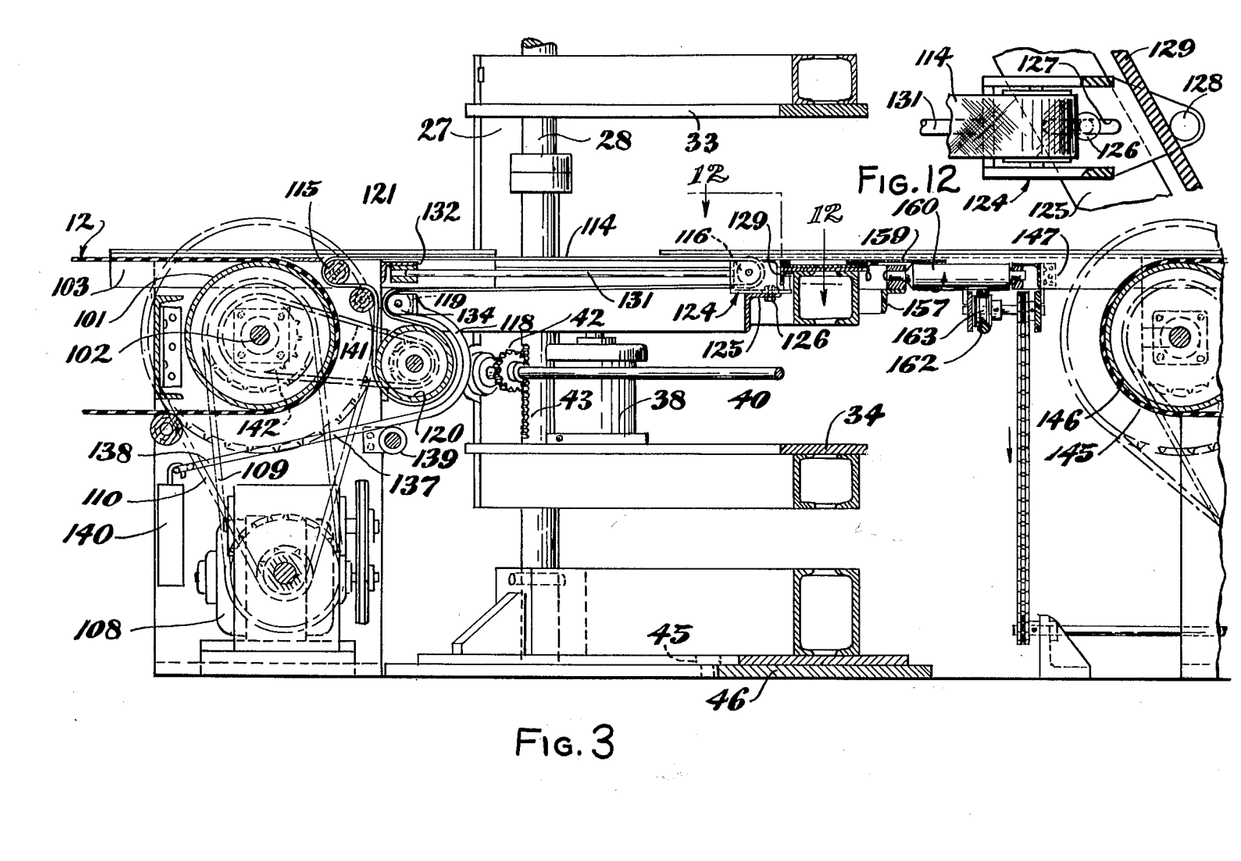
FIG. 3 is an elevational view taken along the line 3—3 of FIG. 1 showing details of the stock-handling mechanisms adjacent the splicing heads, the details of the splicing heads being omitted.
FIG. 12 is an enlarged detail view taken on the line 12—12 of FIG. 3.

Referring to FIGS. 1 and 3, the feed conveyor 12 which delivers pieces of bias cut fabric 15 (e.g. FIG. 6a) from a bias cutter (not shown) to the splicer 10 includes a flexible belt 100 which is trained at its delivery end 11 about a head pulley 101. Only the forward portion of belt 100 and the head pulley are shown in FIGS. 1 and 3, the head pulley 101 being supported on a shaft 102 journaled in the side frame members 103. The shaft 102 projects beyond one side of the frame 103 and has attached to it a slow speed electromagnetic clutch 104, a high speed electromagnetic clutch 105, and an electromagnetic brake 106, the purposes of which are hereinafter described. The clutches 104 and 105 are connected in driving engagement with a drive unit 108 below the conveyor 12 by chains 109 and 110, respectively.

The feed conveyor 12 transfers incoming fabric pieces 15 onto the splicing apron 16 in front of the splicer 10 which consists of a series of narrow, flexible, laterally-spaced belts 114 each having an upper reach extending to the table 31 of the splicer. The belts 114 are of different lengths, but as shown in FIG. 3, each is trained forwardly from a common tail roll 115 near the pulley 101 and around one of an echelon of narrow spools 116 engaged with the lower edge of table 31 of the splicer 10.

The upper reach of each belt 114 is self-adjusting to the proper length when the angle of the splicer 10 is changed, by a takeup arm 118 (FIG. 3) and by the manner in which the spool 116 is connected to table 31. As shown in FIG. 3 each belt 114 is trained from its spool 116 rearward around a slack takeup spool 119 mounted on one end of the takeup arm 118. Then each belt 114 is trained around a common drive roll 120 and upward over a common idler roll 121 to the common tail roll 115. The term "common" means that all the belts 114 engage rolls 115, 120 and 121, whereas each belt has a separate takeup spool 119 and spool 116.

The spool 116 of each belt is individually mounted in a small cage 124 as best shown in FIGS. 3 and 12 which is loosely connected by a stud 126 to a beam 125 extending transversely between the side frame members 103 (FIG. 1) of the apron 16. The stud 126 extends through a slot 127 in the bottom of the cage 124 so that the cage may be shifted forward or backwardly in the direction of travel of the belt 114. The front portion of the bottom of the cage projects under the edge of table 31 and terminates in a vertical cylindrical pin 128 which is tangentially engaged with a downwardly extending flange 129 along the front edge of the table 31. Below the upper reach of the belt 114 a guide rod 131 extends rearwardly from the cage 124 and at its opposite extremity it is slidably received in a bracket 132 on the frame members in front of roll 115. The rod 131 assures that the cage 124 will remain at all times in accurate alignment with the belt.

The slack-takeup pulley 119 is mounted in a clevis 134 at the upper end of the rigid takeup arm 118. This arm 118 is curved to concentrically embrace the drive pulley 120 and then extends rearwardly over a transverse fulcrum bar 137 which is supported between the side frame members 103, and to which arm 118 is pivotally connected by a bar 139 integral with the arm. The opposite end 138 of the take-up arm 118 has a weight 140 suspended from it, the weight acting to pull the end 138 of arm 118 pivotally downward about fulcrum 137 to establish the desired tension in the belt 114. The tension in each belt 114 is individually regulated by its respective takeup arm 118 and weight 140, although all the arms 118 are supported on the common fulcrum bar 137.

The belts 114 are collectively driven so that their upper reaches move toward table 31 of the splicer 10 by a common drive roll 120 about which each belt is snubbed by its respective pulley 119 and the roll 121. Drive roll 120 is driven by a chain 141 (see FIGS. 1 and 3) about a suitable sprocket 142 on pulley shaft 102.

Owing to the cooperation between the table 31 and the cages 124 and to the takeup arms 118, the upper reaches of all belts 114 are simultaneously and proportionally adjusted to the length required when the angular position of splicer 10 is adjusted on pivot 45. For example, when the splicer is adjusted clockwise about pivot 45 in FIG. 1 to shift table 31 to the position indicated in chain dotted lines, the upper reaches of the shorter belts 114 at one side of apron 16 will be automatically extended, whereas the upper reaches of the belts 114 near the other side of apron 16 will be correspondingly shortened. This occurs because for a clockwise adjustment of the table 31, the portion of flange 129 of the table 31 (see FIG. 12) which engages the pins 128 of the several cages of the shorter belts pushes each pin 128 forward proportional to the displacement of the portion of table flange 129 engaging the pin, thereby sliding its cage 124 forwardly on beam 125 the slot 127 of each cage sliding forwardly relative to its stud 126. The guide rod 131 prevents the cage 124 from twisting as the cage is moved forwardly. The additional longitudinal force imposed on the short belts 114 resulting from the forward displacement of their respective cages 124, thus urges the take-up spools 119 of these belts forwardly (see FIG. 3), thereby pivotally swinging their respective arms 118 clockwise on the fulcrum bar 137 and raising their respective weights 140.

Conversely and simultaneously, the upper reach of the longer belts are shortened by a clockwise adjustment of table 31, because when the table 31 is moved clockwise, its flange 129 (FIG. 12) tends to move away from the pins 128 of the cages of the longer belts. This tends to relieve tension in the longer belts 114, and accordingly their weights 140 will sink, thus shortening the upper reaches of these belts and sliding their respective cages 124 rearward until their pins 128 are again seated against the flange 129. A counterclockwise adjustment of splicer 10 about its pivot 45 correspondingly effects the opposite adjustment in the belts 114. Regardless of the angular position of the table, the upper reaches of each of the belts 114 terminate exactly at the front edge of table 31.

The takeoff conveyor 14 comprises a flexible belt 145, the rearward portion of which is shown in FIGS. 1, 1a, and 3, trained about a tail roll 146 supported on a shaft 148 journaled at its ends on the main frame members 147 on opposite sides of the conveyor. Shaft 148 has on one end a low speed electromagnetic clutch 149, a high speed electromagnetic clutch 150, and an electromagnetic brake 151, the function of which will be subsequently described. The clutches 149 and 150 are driven respectively by chains 152 and 153 from a main drive unit 154 (FIG. 1a) below tail pulley 147.

The take-off apron 19 is located between the table 31 and the takeoff belt 145 and includes a generally trapezoidal rigid frame 157 (FIGS. 1 and 3) which is secured to the main frame 147 of the takeoff conveyor 14 and projects therefrom in cantilever fashion toward the table. The side of apron 19 adjacent the splicer 10 is covered with a thin sheet metal flashing 159 which is secured to the table 31 to bridge the gap between the apron 19 and the table. The portion of flashing 159 overlaying the end of the apron is slidably positioned on the apron so that the table 31 may be adjusted relative to the apron.

This apron 19 includes a series of rollers 160 supported by the apron frame for rotation on axes parallel to the longitudinal axis of the takeoff conveyor, the rollers 160 being of varying lengths corresponding to the trapezoidal shape of the frame. The rollers 160 have polished surfaces and while they are each supported for free rotation, the rollers are preferably slowly rotated during splicing operations in a direction to continuously urge a piece of stock 15S (see FIG. 1a) upon the apron laterally toward the upstanding guide rail 23 against which the cut edges 22 of the fabric pieces are aligned. In this embodiment, the rollers are rotated by a small belt 162 (FIG. 1) which extends transversely below the apron tangentially to the rollers 160. Belt 162 may be an ordinary hex-shaped power transmission belt and is trained about pulleys 163 (FIG. 1) at opposite sides of the apron and may be driven by a shaft 164 connected through an appropriate gear reduction unit 165 (FIG. 1a) to the drive 154.

*Positioning Stock Edges for Splicing*

The operating cycle of the splicer 10 and the feed and takeoff conveyors 12 and 14, respectively, will be explained in conjunction with FIGS. 6 and 13–16. FIGS. 13–16 incl. show the principal control elements of the equipment, viz: sets of fingers 180 for "feeling" the edges 17 and 18 of the fabric pieces and initiating the operation of the splicer after the gap between the fabric edges if properly regulated, and a photo-sensing mechanism 182 (FIG. 13) for regulating the speeds of the conveyors 12 and 14 as hereinafter explained.

In the subsequent description of the operating cycle, reference will be made at times to subsidiary devices such as multi-contact electrical relays, limit switches, time-delay relays, etc. all of which are conventional items of hardware and are not shown in the drawings. Furthermore, the actual wiring circuits embodying these various devices are not illustrated because, with the following explanation as to the functions performed by these circuits, the actual circuits will be readily evident to an electrician of ordinary skill, and full illustration of such circuits complicates the drawings. The photo-sensing mechanism 182 includes a light source 183 (see FIGS. 16a–16d) positioned above the apron belts 114 to direct a light beam between two adjacent belts 114 against a photo-tube 184 positioned below the apron belts 114. Fabric pieces 15 which are moved by the belts 114 to the splicing table 31, break and make this light beam as their leading and trailing edges, respectively, are moved below the light source 183.

Figures 14, 15:
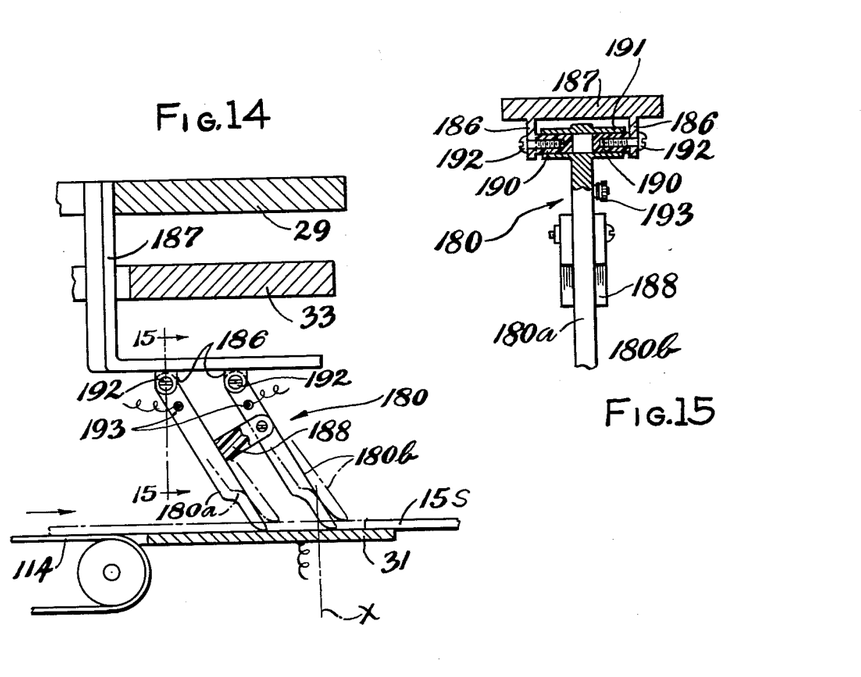
FIG. 14 is a semi-schematic view taken along the line 14—14 of FIG. 13 showing the structural details of one of the sensing mechanisms for positioning the opposing edges.
FIG. 15 is a detailed sectional view taken along the line 15—15 of FIG. 14.

The structural details of the sets of fingers 180 which initiate the operation of the splicer 10 when a leading edge 17 is properly positioned relative to trailing edge 18 are best shown in FIGS. 14 and 15. Each set includes a forward finger 180a and a rearward finger positioned in a common vertical plane. Each finger is a long, thin strip of conductive metal which is pivotally supported for arcuate movement in this common plane between a pair of lugs 186 depending from a support bracket 187. The support brackets 187 may be in turn be secured to the stationary upper tie bar 29 (see FIG. 2) of the splice 10. The brackets 187 thus depend from the tie bar 29 and project under the vertically movable rail 33 of the frame 27 which supports the splicing heads 25, as indicated by the fragmentary portion of rail 33 in FIG. 14.

Figure 13:
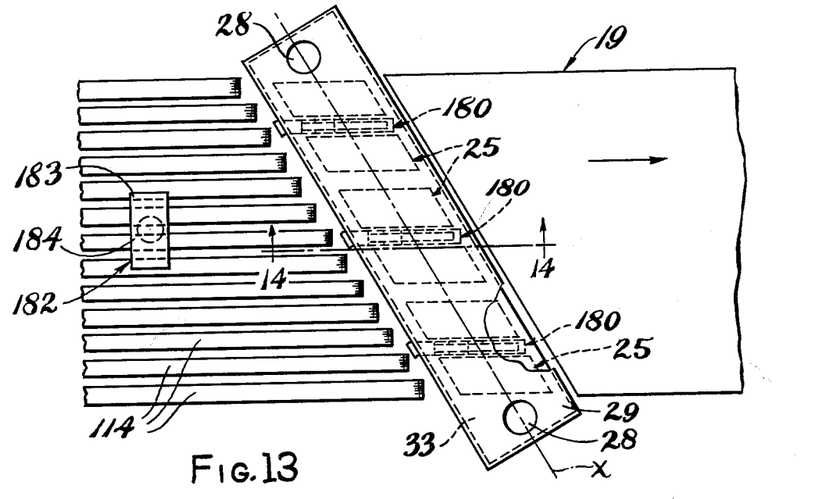
FIG. 13 is a schematic plan view of the splicing mechanism and associated stock handling mechanism, showing the location of the sensing mechanisms for positioning stock pieces.

Preferably several sets of fingers 180 are employed, each set extending vertically between two adjacent sets of splicing shoes 65 as indicated diagrammatically in FIG. 13. A preferred arrangement is represented diagrammatically in FIG. 13 in which a set of fingers 180 is disposed near each end of the splicing table 31, and another set is disposed near the center of the splicing table, each set extending vertically downward between adjacent sets of splicing shoes 65 represented by the chain dotted lines. FIG. 13 further shows that the forward finger 180a of each set is positioned to the left of the splicing axis X, whereas the rearward finger 180b is positioned to the right of the splicing axis.

The fingers 180a and 180b are of equal length and are therefore parallel to each other, and they slant downwardly from their supporting bracket 187 in the direction of travel of the fabric across table 31. The lower end of each finger rests directly against the table 31 and may be swung upwardly away from the table to the dotted position shown in FIG. 14 when a piece of fabric is moved across the table under the fingers. The finger 180b of each set includes a post 188 formed of a non-conductive material such as molded nylon or the like which projects toward and terminates adjacent finger 180a. Thus, when finger 180a is swung upwardly as a piece of fabric is moved against it, finger 180a engages post 188 and thereby swings finger 180b upwardly from the table also. With this arrangement, it will be apparent that when a trailing edge of a fabric piece has been moved beyond the tip of finger 180a, this finger is free to swing rearwardly against the table 31, whereas finger 180b will remain supported in its upper arcuate position by the fabric until the trailing edge also has been moved beyond finger 180b. Thus, the fingers may be swung upwardly in unison, but they return to engagement with the table independently of each other.

Each finger 180a and 180b is insulated at its upper end from the bracket 187 by plugs 190 (FIG. 15) of non-conductive material seated within the opposite ends of a of a transverse tube 191 which is welded to the upper end of each finger. The plugs 190 project slightly beyond the ends of the tube 191 and engage the lugs 186 to receive axial screws 192 which extend through the lugs and into the ends of the plugs 190. Near the upper end of each finger there is a terminal 193 to which a lead wire from electrical circuits operated by the fingers is connected. Each finger between its terminal 193 and its lower end serves as one conductor of an operating circuit which is closed when the tip of the finger is resting upon the metal table surface 31 and which is broken when the fabric pieces displace the fingers arcuately upwardly from the table.

Figure 16A:
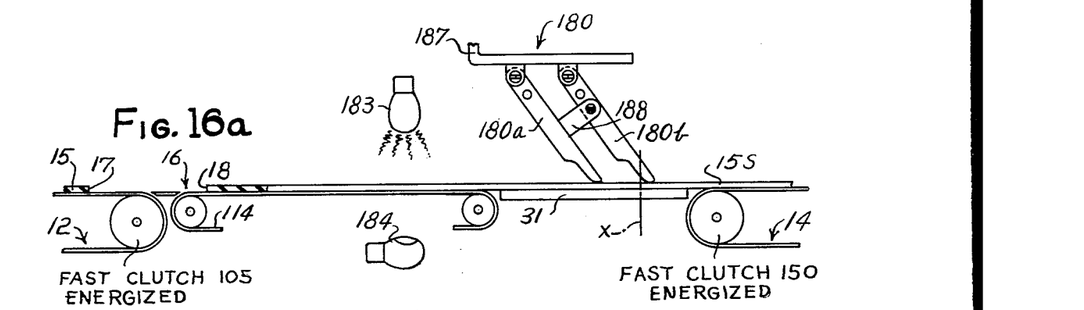
FIGS. 16a, 16b, 16c and 16d are schematic views showing successive stages in positioning fabric pieces for splicing.
Figure 16B:
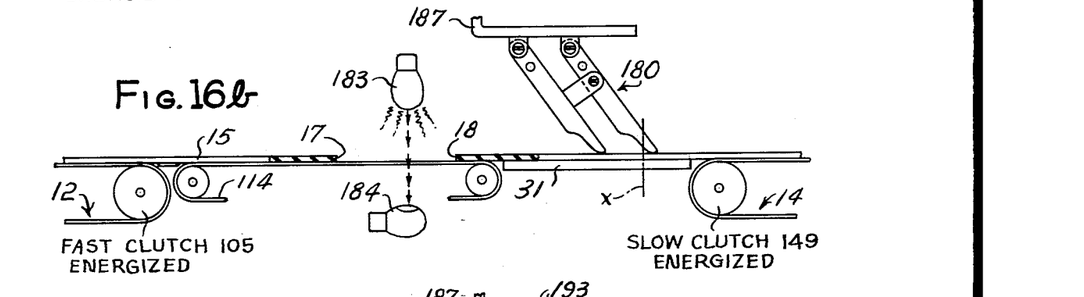

FIGS. 16a–16b illustrate schematically the operation of the sets of fingers and the photo-sensing device 182 during one complete automatic cycle of the equipment. The thickness of the fabric pieces 15 and 15s in these views is shown greatly exaggerated as compared with the proportons of the other elements.

FIG. 16a depicts the condition of the equipment at the conclusion of a butt splice and just after the splicing heads 25 have been retracted from the fabric. At this stage of operation, the fingers 180a and 180b are resting upon the fabric and straddling the newly formed splice, indicated at X. A substantial portion of the fabric extends leftward from the splice and is supported on the receiving apron 16 so that the beam between the light source 183 and the photo-tube 184 is broken.

Taking this condition as the start of the operating cycle, the first operation performed by the equipment is to feed the spliced strip 15s rightward onto take-off conveyor 14. To accomplish this an appropriate limit switch (not shown) will be provided on the columns 28 in a position in which it will be closed by the frame 27 when the frame reaches its uppermost position (FIG. 2). This limit switch will operate appropriate relays (not shown) to engage the fast clutch 150 of take-off conveyor 14, and also the fast clutch 105 of the delivery conveyor 12 as indicated by the legends in FIG. 16a. Thus, the fabric strip 15s is immediately fed rapidly rightward onto conveyor 14, and simultaneously a new fabric piece 15 will be delivered toward the splicer table 31 by the conveyor 12. Normally, the new piece 15 will be positioned on its conveyor 12 so that its leading edge 17 is spaced at least two feet or more from the trailing edge 18 of the strip 15s. Preferably, the conveyors 12 and 14 advance the fabric in the order of about 225 feet per minute during their high speed operation.

The strip 15s is therefore fed at high speed across the table 31 with the sets of fingers 180 dragging lightly on its upper surface until its trailing edge 18 has been moved beyond the light source 183 so that the circuit is made between the light source and the photo-tube 184. This latter circuit then operates appropriate relays (not shown) to de-energize high speed clutch 150 and to energize slow clutch 149 of conveyor 14 which preferably reduces the linear speed of the strip 15s to about 25 feet per minute. This condition is illustrated in FIG. 16b.

The conveyor 12 continues to operate at high speed so that the leading edge 17 of the new fabric piece 15 begins to rapidly overtake the trailing edge 18 of the strip 15s. However, soon after the beam circuit is made, the leading edge 17 of fabric 15, is delivered onto the apron belts 114 and is advanced to a position to break the beam circuit. This results in an appropriate circuit being energized to disengage the fast clutch 105 and engage the slow clutch 104 of conveyor 12 so that the new fabric piece 15 is advanced at a slower speed, equal to the linear speed of fabric 15s.

Figure 16C:
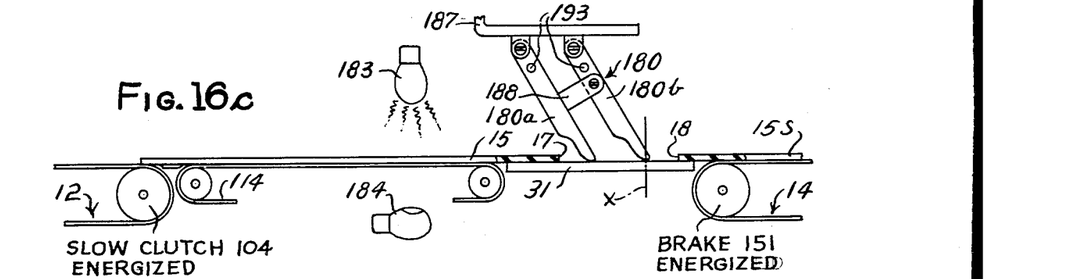
Figure 16D:
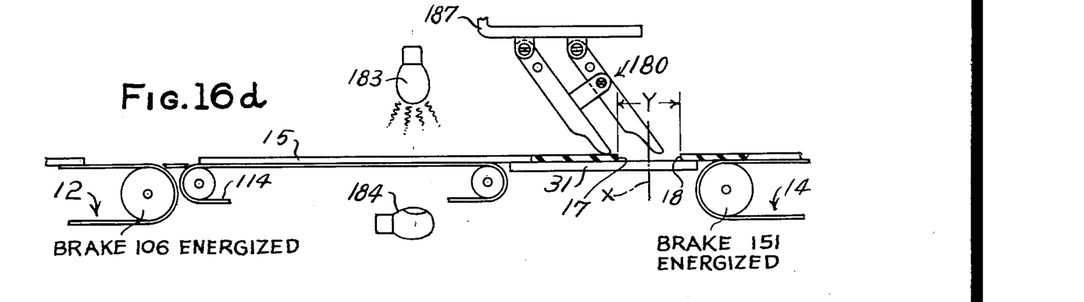

With strip 15s and fabric piece 15 each advancing at slow speed (the leading edge 17 now being several inches from the trailing edge 18), the leading edge 18 eventually is moved beyond the tip of finger 180b allowing this finger to swing arcuately downward to engage the table 31 as shown in the FIG. 16c. The finger 180b then completes an appropriate circuit through the table 31 to actuate the brake 151 of conveyor 14 and stop strip 15s adjacent finger 180b and near the splicing axis X. Meanwhile, strip 15 continues to be fed slowly forwardly toward the splicing axis X until its leading edge 17 moves against and under the tip of finger 180a. This swings both fingers 180a and 180b away from the table and thereby breaks a circuit through the table which actuates the brake 106 of conveyor 12 to stop the linear advance of fabric piece 15. Thus, fabric piece 15 is stopped with its leading edge 17 slightly to the left of axis X (see FIG. 16d) and spaced from but substantially parallel to the trailing edge 18 of strip 15s on the opposite side of axis X as shown in FIG. 16d. The opposing margins are now positioned for splicing.

In addition to energizing brake 106, this latter displacement of the fingers 180a also causes the energization of a circuit independent of brake 106 which operates a suitable solenoid valve (not shown) to actuate the head operating cylinders 38 (FIG. 2). The cylinders 38 operate, therefore, to lower frame 27 and the splicing heads 25 toward the margins. The edges 17 and 18 are in the position of FIG. 16d when their respective margins are engaged by the splicing shoes 65 of the several splicing heads.

The gap indicated by dimension Y in FIG. 16d between edges 17 and 18 is preferably less than about ⅛ inch but may be much greater, depending on the manner in which the splicing heads are designed. As previously explained, the shoes of the splicing heads 25 urge the opposing margins together to forcibly butt the edges 17 and 18 until these edges are mutually adhered. The subsequent retraction of the heads after the splice concludes one full cycle of operation.

During the downward movement of frame 27 to engage the splicing heads with the fabric, the frame preferably engages a suitable limit switch (not shown) which will energize a circuit to reset the various relays which control the motions of the conveyors 12 and 14 so that they are immediately ready for high speed operation when the frame 27 is thereafter retracted at the conclusion of the splice forming strip.

Preferably the previously mentioned circuit operated by the displacement of finger 180a by leading edge 17 (FIG. 16d) which initiates the downward movement of frame 27, includes a timing device (not shown) which causes the frame 27 to automatically retract at the end of a period sufficient for the splicing shoes to complete their coplanar movement. Ordinarily the splicing heads require no more than about one-half second to make a splice. When the frame 27 is again returned to its upper-most position, the fast clutches 105 and 150 are energized to commence a new cycle.

Several sets of fingers 180 are employed to insure that all portions of the edges 17 and 18 are positioned with a gap not exceeding dimension Y of FIG. 16d before the splicing heads are lowered. Although the edges 17 and 18 normally will be positioned substantially parallel each other, there may be certain irregularities in the shape of the edges such that the fingers 180a of one set may be swung away from the table prior to a similar movement of fingers 180a of another portion of another set. The circuits operated by the fingers are therefore preferably arranged so that the splicing heads 25 can not operate until all fingers 180a are raised from the table to a position of FIG. 16d. As few as one set of fingers 180 may be used at the center of the operating table to obtain successful operation, but the additional sets insure proper operation of the splicing heads along all portions of the edges.

*Summary of Operation*

From the foregoing, it will be evident that as soon as a new fabric piece 15s is spliced to the trailing edge 18 of the preceding fabric strip, the resulting spliced strip may be fed optionally by the conveyor 14 to either a tire building machine or to a suitable wind-up mechanism, until the trailing edge 18 of the strip is positioned on the splicing table as shown in FIG. 16c. Simultaneously, a new piece of fabric 15 is delivered at high speed onto the apron 16 by the conveyor 12, and then, after it breaks the beam from source 183, it is moved slowly to position its leading edge 17 adjacent the splicing axis on the table 31. The resulting displacement of the fingers 180 results in actuating the operating cylinders 38 which lowers the frame 27 to bring the splicing shoes 65 against the margins of the fabric pieces terminating at the edges 17 and 18.

The splicing shoes 65 of the several heads cooperate with the table 31 to confine the margins throughout their respective lengths and downward movement of the frame 27 following the initial engagement of the splicing shoes with the fabric margins urges the opposing shoes of the several heads into deep meshing engagement. The initial coplanar movement of the splicing shoes urges the confined margins toward each other until their edges 17 and 18 are forcibly butted together. In the latter portion of the coplanar stroke of the splicing shoes 65, a small narrow layer of the rubber cover of the margins is transposed by each tooth 68 across the junction of the butted edges 17 and 18 to amalgamate the covers of the abutting margins.

When the teeth of the splicing shoes are fully meshed at the conclusion of their splicing stroke, upward movement of frame 27 relieves the confining pressure and the springs 70 (FIG. 7) resets the splicing shoes to their initial position. As the frame 27 approaches its uppermost position, the conveyors 12 and 14 are actuated to reposition the spliced strip 15s and a new fabric piece 15 under the splicing shoes.

The term "rubber" used herein includes naturally occurring elastic vulcanizable materials as well as chemically synthesized materials having properties similar to natural rubber.

Variations in the structure disclosed may be made within the scope of the appended claims.

I claim:

1. The method of splicing rubber adhesive sheet material which method comprises positioning margins of the material with edges thereof in opposed relation, exerting confining pressure on said margins throughout the length of said opposing edges, and while maintaining said confining pressure, forcibly butting said opposed edges against each other into mutually adhering relation, and transferring some of the material of one margin across the junction of the opposing edges to the other margin to further amalgamate the adhering edges.

2. The method of splicing rubber adhesive sheet material which method comprises positioning margins of the material with edges thereof in opposed relation, exerting confining pressure on said margins throughout the length of said opposing edges, and while maintaining said confining pressure, forcibly butting said opposed edges against each other to mutually adhere said edges, and transferring alternate narrow strips of material from each margin across the junction of the opposing edges to the other margin to further amalgamate the adhering edges.

3. The method of butt-splicing margins of unvulcanized rubber-covered tire cord fabric, which method comprises positioning margins of the material terminating in edges parallel to the lay of the cords in said margins so that said edges are in opposed coplanar relation, exerting confining pressure on substantially the complete area of said margins along said opposing edges, and while maintaining said confining pressure, forcibly butting said opposed edges against each other into mutually adhering relation, and transferring some of the rubber covering of one of the margins across the junction of said opposing edges to the other margin to pack some of the rubber thus transposed into interstices, if any, between cords close to the junction of said adhering edges.

4. The method of butt-splicing margins of bias cut pieces of unvulcanized rubber-covered tire cord fabric, which method comprises positioning margins of the material terminating in edges parallel to the lay of the cords in said margins so that said edges are in opposed laterally-spaced coplanar relation, exerting confining pressure on substantially the entire area of each said margin throughout the length of its respective opposing edge, and while maintaining said confining pressure, displacing said margins relatively toward each other in coplanar relation by applying displacing force acting in a direction at an angle to said opposing edges substantially equal to the angle at which the pieces have been bias cut and forcibly butting said opposed edges against each other until they are mutually adhered, and transferring alternate narrow strips of the rubber covering material from each margin across the junction of the opposing edges to the other margin to pack some of the rubber thus transposed into interstices, if any, between cords within said margins close to said adhering edges.

5. The method of butt splicing the edges of two lengths of rubberized fabric comprising clamping one edge along spaced segments of the margin adjoining such edge, clamping the other edge along spaced segments of the margin adjoining such other edge, bringing the two edges, while thus clamped, forcibly together with the clamped segments of one edge engaging the unclamped segments of the other edge, and transferring some of the rubber material of one clamped margin across the junction of the opposing edges to the other margin to further amalgamate the adhering edges.

6. The method defined in claim 5 which comprises transferring the rubber material of said one clamped margin from a series of narrow laterally spaced zones of said margin where said margin is initially clamped.

7. The method defined in claim 5 which comprises transferring some of the rubber material from each margin across the junction of the opposing edges to the other margin to further amalgamate the adhering edges.

8. The method defined to claim 5 which comprises transferring some of the rubber material from each margin across the junction of the opposing edges to the other margin from a series of narrow laterally spaced zones of each margin where said margin is initially clamped.

9. The method of butt-splicing the edges of two pieces of parallelogram shaped bias-cut rubberized fabric comprising clamping one edge along spaced segments of the margin adjoining such edge, clamping the other edge along spaced segments of the margin adjoining such other edge, bringing the two edges, while thus clamped, forcibly together with the clamped segments of one edge engaging the unclamped segments of the other edge, and exerting the force for bringing the two edges together and to effect adherence of said edges at an angle to said clamped edges at substantially the same angle at which said pieces are bias cut.

10. Apparatus for splicing rubber adhesive sheet material comprising means for supporting margins of the material with edges thereof in opposed relation, means for exerting confining pressure on said margins throughout the length of said opposing edges, means operable while said confining pressure is maintained for forcibly butting said opposed edges against each other into mutual adhering relation, and means for transferring some of the material of one margin across the junction of the opposing edges to the other margin to further amalgamate the adhering edges.

11. Apparatus for butt splicing the edges of rubberized fabric comprising means for clamping one edge along spaced segments of the margin adjoining such edge, means for clamping the other edge along spaced segments of the margin adjoining such edge, means to bring said aforesaid means relatively toward each other to urge said clamped edges into forcible engagement with the clamped segments of one edge in contact with the unclamped segments of the other edge, and means for transferring some of the rubber material of one said clamped margin across the junction of the opposing edges to the other margin.

12. Apparatus as defined in claim 11 wherein said transferring means effects transfer of some of the rubber material of said one clamped margin from a series of narrow laterally spaced zones of said margin where said margin is initially clamped.

13. Apparatus as defined in claim 11 wherein said transferring means effects transfer of some of the rubber material from each margin across the junction of the opposing edges to the other margin from a series of narrow laterally spaced zones of each margin where said margin is initially clamped.

14. Apparatus for butt-splicing edges of self-adhering sheet material such as unvulcanized rubber comprising means for supporting margins of the sheet material with edges thereof in opposed relation, a pair of splicing elements having mutually coplanar material-engaging surfaces facing said material-supporting means, said surfaces being engageable with the opposing margins, means for bringing said surfaces of said splicing elements into pressure confining engagement with the margins of the pieces on said material-supporting means, means for displacing said splicing elements relatively toward each other with said material-engaging surfaces maintained in confining engagement with said margins to butt said opposing edges forcibly together, and means for displacing said splicing elements further toward each other and relative to said margins after said edges thereof are in abutting engagement to transfer portions of the material from one margin across the junction of said abutting edges to the other margin to further amalgamate said edges.

15. Apparatus as defined in claim 14 wherein said pair of splicing elements have teeth intermeshed with each other in laterally abutting slidable relation and said coplanar material-engaging surfaces are on the bottom of said teeth facing said material-supporting means.

16. Apparatus as defined in claim 15 wherein said material-engaging surfaces of said splicing elements are striated for frictionally engaging said margins and transferring a thin surface layer of the material of one margin to the other margin.

17. Apparatus for butt-splicing opposed edges of self-adhering sheet material such as unvulcanized rubber, said apparatus comprising a pair of splicing elements each having a series of narrow teeth members disposed in intermeshed laterally abutting longitudinally slidable relation one to another, said teeth having mutually coplanar surfaces for engaging one side of the margins of said opposed edges of said sheet material; material supporting means having a series of narrow bars disposed in laterally abutting longitudinally slidable relation one to another and having mutually coplanar surfaces for engaging the opposite side of the margins of said opposed edges of said sheet material; said series of teeth and said series of bars being disposed transversely to said opposed edges of the sheet material and extending from one margin to the other margin on their respective sides of the margins; each of said teeth being parallel to and engageable with an area of said margins directly opposite the area on the opposite sides of said margins engaged by one of said bars; means for bringing said bars and said teeth into mutual confining engagement with said margins; means for longitudinally moving alternate teeth and their respective mating bars jointly relative to the intervening teeth and bars with said material-engaging surfaces of the teeth maintained in confining relation with said margins to forcibly butt said opposed edges against each other until the edges are mutually adhered, and means for moving alternate teeth of said splicing elements longitudinally past each other relative to said margins after the edges are in abutting relation to further amalgamate the union of said edges.

18. Apparatus for butt splicing opposed edges of self-adhering sheet material such as unvulcanized rubber, said apparatus comprising a pair of opposed splicing elements each having a heel portion and a plurality of teeth projecting therefrom toward the other splicing element, the teeth of one element being intermeshed with the teeth of the other element in longitudinal sliding abutting relation, each said element having a fabric-engaging surface on said heel portion and on said teeth which surface of mutually coplanar with corresponding surfaces of the opposing element; means for supporting opposing margins of said sheet material adjacent said coplanar fabric-engaging surfaces of said splicing elements and with said splicing elements straddling opposing edges of said margins; said supporting means comprising a series of longitudinally slidable bars having flat coplanar fabric-supporting surfaces, each bar mating with a tooth of one of said splicing elements and engaging a portion of said margins directly opposite the portion thereof engaged by its respective tooth; means for bringing said splicing elements into confining engagement with opposing margins of said sheet material supported on said bars; means for moving said splicing elements relatively toward each other with said fabric-engaging surfaces of said heel and teeth portions of said elements maintained in confining engagement with said margins throughout the range of movement of said splicing elements to slide said teeth longitudinally past each other and thereby displace said fabric margins to butt their respective opposing edges forcibly against each other, each said bar being longitudinally movable with its respective tooth by frictional engagement of said bar with the intervening margin portion; said fabric-engaging surfaces of said teeth of said splicing elements further including a series of ridges; and means for moving said splicing elements relatively toward each other and to said margins after said edges are engaged whereby said ridges transpose a thin skin portion of the material from each margin across the butted edges to the opposing margins.

19. Apparatus for butt-splicing opposed edges of self-adhering sheet material such as unvulcanized rubber, said apparatus comprising means for supporting margins of said material with edges thereof in opposed relation for splicing; a plurality of splicing heads, each head comprising a pair of opposed splicing shoes for straddling said opposed edges of the margins of the material on said supporting means, each shoe having a heel portion and a plurality of teeth extending transversely to said opposed edges of the margins and normally intermeshed partly with corresponding teeth of the opposed shoe, and said shoes having flat mutually coplanar fabric-engaging surfaces on said heel portion and on said teeth directed toward said supporting means; means mounting each pair of splicing shoes within its respetive head for coplanar movement of said shoes toward each other with said teeth intermeshed in response to upward force on said fabric-engaging surfaces of the shoes; a spring normally biasing the shoes of each pair apart from each other; means normally supporting said heads away from said supporting means; means for bringing the fabric-engaging surfaces of said shoes of all said heads simultaneously into confining pressure engagement against the opposing margins of sheet material on said margin-supporting means whereby said shoes of each pair are movable relatively toward each other in response to said confining pressure to bring the opposed edges of said margin into forcible abutting engagement, and means for displacing said shoes relatively toward each other and relative to the margins after the edges of said margins are in abutting engagement to transfer portions of the material from each margin across the abutting edges thereof to the other margin to further amalgamate said edges.

20. Apparatus as defined in claim 19 in which said margin-supporting means comprises a plurality of narrow individual bars each disposed parallel to and laterally opposite a tooth of each splicing shoe of each splicing head, each bar mating with its respective tooth along directly opposite portions of said margins and cooperating with its respective tooth for frictionally engaging said portions of the margins, means slidably supporting each said bar for longitudinal movement with its respective mating tooth when said opposed edges are brought forcibly together.

21. Apparatus as defined in claim 20 and further comprising means for biasing said bars of said support means for opposing said longitudinal movement thereof.

22. Apparatus as defined in claim 19 and further comprising a single rigid frame collectively supporting said plurality of splicing heads; and means supporting said frame for reciprocable movement relative to said margin supporting means to bring said splicing heads into engagement with said margins, each splicing head functioning independently of the others on said margins but being collectively controlled by the position of said frame.

23. Apparatus for butt splicing margins of bias-cut pieces of unvulcanized rubber-covered tire cord fabric, the apparatus comprising two sets of laterally abutting intermeshing teeth members, the teeth members of each set having flush material-engaging surfaces facing the corresponding flush surfaces of the teeth members on the other set of teeth members; means for positioning margins of said fabric terminating in edges parallel to the lay of the cords of said fabric so that said edges are in opposed coplanar relation on the material-engaging surfaces of one set of teeth members and said teeth of each set are disposed at an angle to said opposed edges substantially equal to the bias angle of said pieces; means for confining the margins along the entire extent of said edges between said material-engaging surfaces of said sets of teeth members; and means for displacing adjacent teeth members of each set in counterdirections with said material-engaging surfaces of said teeth members engaged with the margins for forcibly butting said opposed edges against each other until they are mutually adhered.

24. Apparatus in accordance with claim 23 in which said positioning means is operable to position said edges with a predetermined gap therebetween, and in which the length of said splicing stroke of said teeth members is greater than the width of said gap, and wherein the material-engaging surfaces of one set of teeth members includes fine ridges to scrape rubber from one of said margins and transpose it to the other margin during that portion of said splicing stroke which exceeds the width of said gap.

25. In a butt-splicing machine, a splicing head comprising two rigid laterally spaced legs; a pair of rigid bars between said legs; each bar being parallel to and mated with a corresponding leg; levers pivotally connecting each leg and its respective bar, said levers being proportioned so that each bar is movable toward or away from its respective leg but remaining parallel therewith; a splicing shoe connected to each bar, each shoe having a flat material-engaging splicing face and the faces of each shoe being coplanar with each other throughout the range of movement of said bars relative to said legs; and means for biasing said bars to a normal position close to said legs.

26. A splicing head as defined in claim 25 wherein each splicing shoe has a plurality of teeth intermeshed between corresponding teeth of the other splicing shoe, said teeth of said shoes being in lateral abutting intermeshing relation to each other and being adapted to slide longitudinally past each other when said bars are moved pivotally relative to said legs to maintain said flat material-engaging splicing faces in mutual coplanar relation.

27. Apparatus of the character described in claim 19, and further comprising means for advancing two bias-cut fabric pieces in a direction parallel to their respective bias-cut edges toward said margin-supporting means, the pieces being advanced with a trailing edge of one piece in laterally spaced apart relation to a leading edge of the other piece, means for retarding the advance of said piece having the trailing edge as the trailing edge thereof is advanced into proximity with said margin-supporting means, means for sensing when said trailing edge is accurately aligned with said splicing heads and stopping the advance of said piece, means for retarding the advance of said piece having a leading edge as the leading edge thereof is advanced into proximity with said margin-supporting means, means for sensing when said leading edge is accurately aligned with said splicing heads and stopping the advance of said piece with said leading edge in opposed relation to said trailing edge, and means operable sequentially with the last named means for operating said frame to bring said splicing heads into confining engagement with the margins of said leading and trailing edges of the fabric pieces.

References Cited in the file of this patent
UNITED STATES PATENTS

| | | |
|---|---|---|
| 2,024,577 | Haase | Dec. 17, 1935 |
| 2,254,596 | Breth et al. | Sept. 2, 1941 |
| 2,473,067 | Miller | June 14, 1949 |
| 2,487,149 | Leguillon | Nov. 8, 1949 |
| 2,567,150 | Frazier et al. | Sept. 4, 1951 |
| 2,606,136 | Garrett et al. | Aug. 5, 1952 |
| 2,702,070 | Lindemann | Feb. 15, 1955 |

UNITED STATES PATENT OFFICE
CERTIFICATE OF CORRECTION

Patent No. 3,130,100                          April 21, 1964

Victor H. Hasselquist

It is hereby certified that error appears in the above numbered patent requiring correction and that the said Letters Patent should read as corrected below.

Column 10, line 49, for "fiashing" read -- flashing --; column 12, line 8, strike out "of a"; line 17, for "and" read -- end --; column 15, line 50, for "to" read -- in --; column 17, line 19, for "of" read -- is --; line 63, for "respetive" read -- respective --.

Signed and sealed this 22nd day of September 1964.

(SEAL)
Attest:

ERNEST W. SWIDER                        EDWARD J. BRENNER
Attesting Officer                        Commissioner of Patents